R. N. EVANS & P. T. HAMM.
ANTISKID DEVICE FOR TIRES.
APPLICATION FILED JUNE 4, 1910.
979,140.
Patented Dec. 20, 1910.
2 SHEETS—SHEET 2.
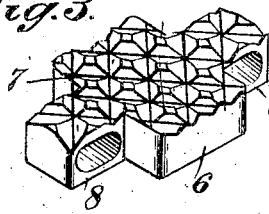
Fig. 3.
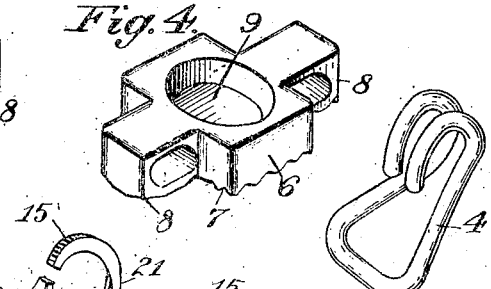
Fig. 4.  Fig. 9.
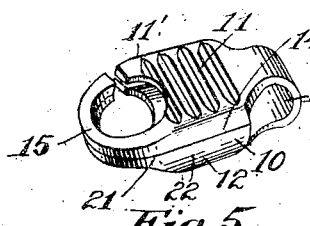
Fig. 5.
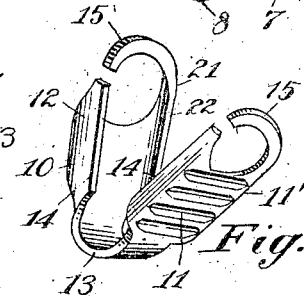
Fig. 6.
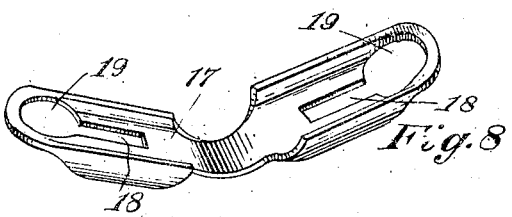
Fig. 8.
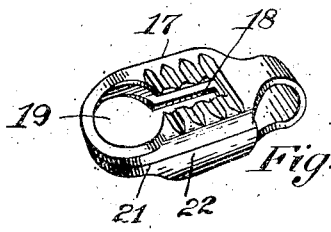
Fig. 7.
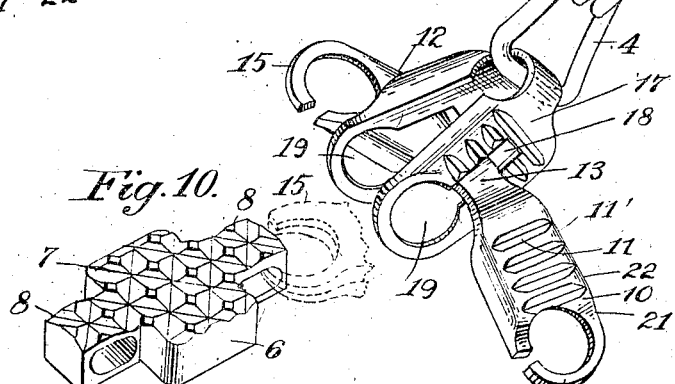
Fig. 10.
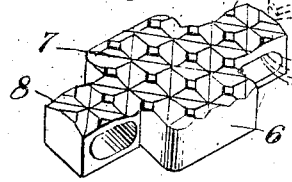
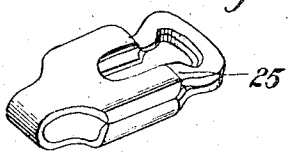
Fig. 11.
Witnesses:
Inventors
Robert N Evans
Phillip T Hamm
By their Attorney

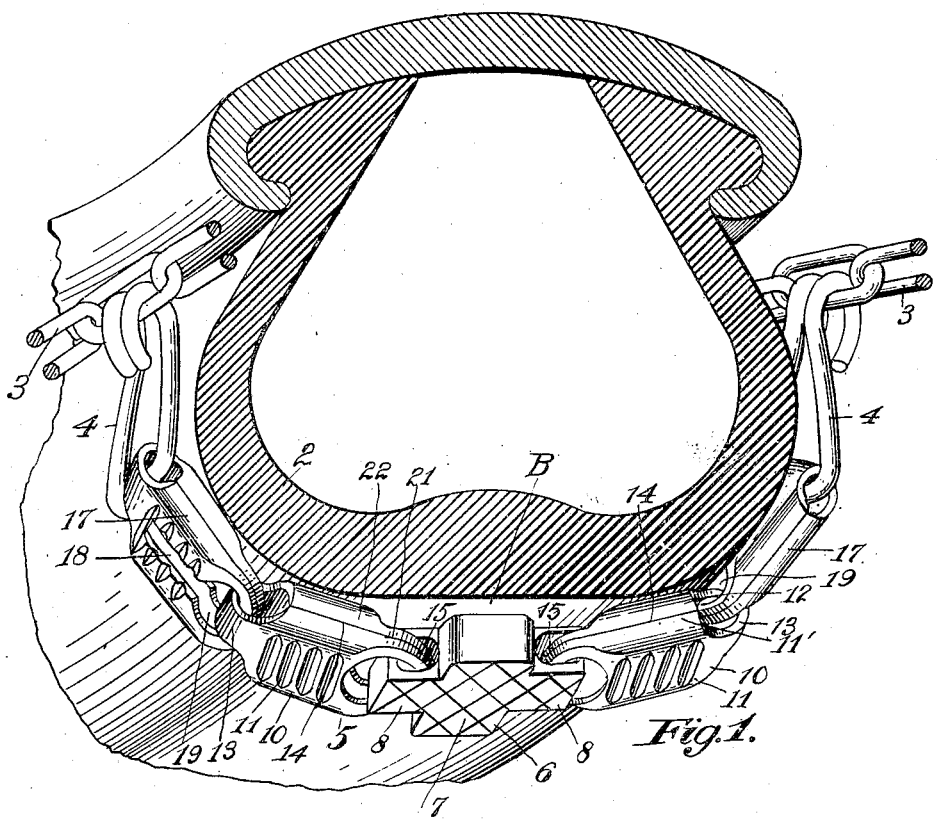
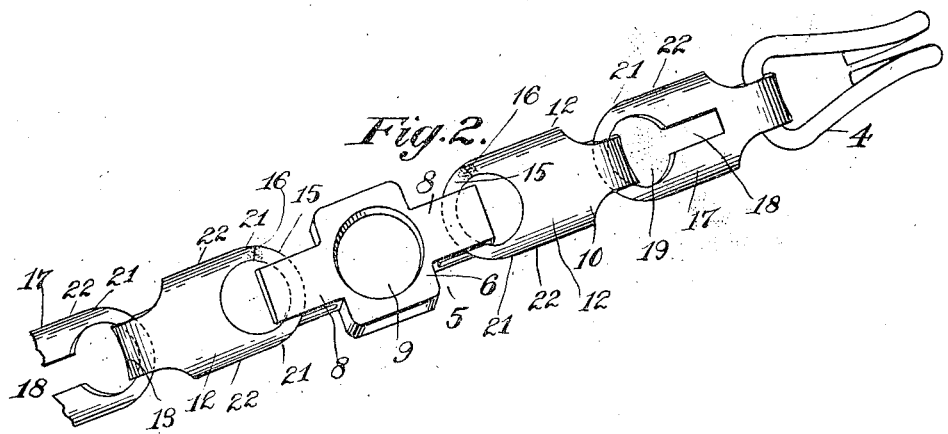

UNITED STATES PATENT OFFICE.

ROBERT N. EVANS AND PHILLIP T. HAMM, OF NEW YORK, N. Y., ASSIGNORS TO ATLAS CHAIN COMPANY, OF BROOKLYN, NEW YORK, A CORPORATION OF NEW YORK.

ANTISKID DEVICE FOR TIRES 979,140.  Specification of Letters Patent.  Patented Dec. 20, 1910.

Application filed June 4, 1910. Serial No. 564,951.

*To all whom it may concern:*

Be it known that we, ROBERT N. EVANS and PHILLIP T. HAMM, citizens of the United States, residing at New York, borough of Brooklyn, in the county of Kings and State of New York, have invented certain new and useful Improvements in Antiskid Devices for Tires, of which the following is a specification.

This invention relates to anti-skid devices, commonly known as tire chains for vehicle tires and particularly motor vehicle tires, the object of the invention being to provide an anti-skid tire chain, made up of a series of cross members, each comprising a plurality of links so constructed as to insure greater longevity to the chain in use, and to facilitate the assemblage thereof and in consequence the expense of manufacture reduced.

A further object of the invention is the provision of an improved cross member, each made up of improved box links.

A further object of the invention is the provision of an improved cross member for an anti-skid chain made up of a series of differently formed links, whereby the assemblage thereof is facilitated, and which links may be provided with roughened surfaces to increase the holding power thereof on the roadway.

In the drawings accompanying and forming part of this specification, Figure 1 is a perspective sectional view of a portion of a motor vehicle tire with one of these improved cross members secured thereto; Fig. 2 is a perspective plan view of the tire engaging side of the cross member; Fig. 3 is a perspective view of the intermediate solid link; Fig. 4 is a rear view thereof; Fig. 5 is a perspective view of one of the box links adapted for connection with the block or solid link; Fig. 6 is a view of the same link partly opened; Fig. 7 is a perspective view of one of the box links adapted for connection with the link shown in Figs. 5 and 6; Fig. 8 is a view of the same link shown in Fig. 7 partly opened; Fig. 9 is a detail perspective view of the loop or link for attaching the cross member to the side chain; Fig. 10 is a detail view illustrating the method of articulating the several links, and Fig. 11 illustrates a portion of another form of link.

Similar characters of reference indicate corresponding parts throughout the different figures of the drawing.

In the present improvement the tire 2 is provided with the usual side chains 3, to which all of the several cross members forming the anti-skid chain are connected by suitable hooked links 4. It is desirable to provide at the center B of the tread surface of the tire a block link, and in order that this link have its greatest efficiency it is desirable that it be so formed that it will not slip upon the tire, and for this purpose we have shown the block link provided with a suction chamber on its rear side. Each cross member 5 therefore includes, in the present improvement, a block center link 6, having a roughened tread surface 7, and is formed with a pair of laterally extending apertured ears 8, for connection with a pair of box links. This block link, which is located midway of the cross member, is provided with a chamber 9, at its rear side forming what may be considered as a suction chamber for preventing the slippage of the link upon the tire. This suction chamber not only accomplishes this, but also reduces the weight of the link, while at the same time permitting the use of a block link at the point of greatest wear. By forming the link with a chamber at its rear side only, instead of an opening therethrough, the penetration of grit and dirt into contact with the tire and the consequent damage is materially prevented.

To each side of the block link is connected what may be termed a box link 10, which preferably also has a roughened tread surface 11. Each of these box links 10 comprises a pair of duplicate parallel relatively flat members 11 and 12 connected by a narrow neck or bent portion 13. These parallel members are offset or spaced apart, their side edges 14 being turned inwardly to engage each other to maintain such parallel portions spaced apart. Each of these relatively flat spaced apart portions is provided with a loop 15, split at one side to permit the insertion of the loop into one of the openings of the block link in the manner shown in dotted lines Fig. 10, after which this loop end is suitably connected, as by soldering or brazing to the box link, as at 16 Fig. 2, the split of the loop being at one side thereof to facilitate this operation. The loop or loops 15 of each box-formed link project beyond the flat or tread portion of the link and preferably within the plane of such flat or tread portion, so that the wear will come upon the flat tread portion of the link and not upon the loop forming portion, which, as will be seen, is comparatively thin and could not readily sustain such wear. Connected to each of these box links 10 is a similarly formed box link 17, in which however the loop is unsplit. Each of these box links 17 is provided with a longitudinal slot 18, communicating with the opening 19 formed by its loop 20. The two outer box links of the cross member are articulated with the links 15, in the manner shown in Fig. 10, that is to say, each link 17 before its parallel portions are bent into engagement is passed transversely through the longitudinal slot 18 of the link 17 until the neck portion 13 of the link 10 is in juxtaposition to such slot, whereupon, by shifting the link 10 endwise into the opening 19 of the link 17, it can be turned and then the two flat portions brought together in a manner that will be readily understood. Thus we are able to provide a cross member made up of box formed and block links, all readily assembled without any soldering or brazing, except at two points and without the necessity of having more than two of the links provided with split loops.

From the foregoing it will be observed that the cross member is made up of three different forms of links, and this facilitates the assemblage of the several links of the cross member, thus very much simplifying the cost of manufacture of the tire chain. It will also be observed that the loops of the box links have their outer side edges 21 in alinement with the outer sides 22 of the body of the link, thus forming a continuous, unbroken or unrecessed surface, so that the link is as strong at this point as at other points thereof.

In various forms of box links heretofore constructed, the loop portion is so connected with the body of the link, that after a certain amount of wear the link first gives away at this juncture point, by reason of the fact that the outer side edges of the loop are not continuous with the outer side edges of the link body, but are connected with such body at each side by a narrow neck portion 25, see Fig. 11. Thus when the parallel tread portion of the link has become worn away the link breaks at this weak point, so that the life of the link is somewhat shorter than it should be. In order to prevent this, we have so formed each box link that its loop is joined therewith by a continuous broken and unrecessed side surface, so that the loop will not break off from the link body until the tread surface of the link has been thoroughly worn out. By forming the box links in the manner shown with the outer sides of the loops forming continuations of the parallel or straight sides of the body, the links may be somewhat smaller than heretofore, since they are very much stronger.

The tread portions of the links, as hereinbefore stated, have their surfaces roughened, and in the forms of links shown the block link is provided with a series of projections for this purpose, while the box links are provided with a series of transverse corrugations or projections for the same purpose.

It will also be observed that in the present improvement, the outer sides of the box links are curved, thus forming not only a much neater link, but one without any sharp corners or edges to contact with the tire.

It will be observed that the block link is of cross shape and comprises a body or central portion of relatively great width and breadth, and extensions or ears for the reception of the loops of adjacent links, these extensions or ears being of much less width than the width of the body, so that they are adapted to receive the eyes or loops of the box links at each side thereof, the openings of which may be of less width than the maximum width of the box links. It will also be observed that the width of the block or center link is considerably greater than the width of the box links, so that it projects beyond the plane of the sides of the box links. By forming the block link of considerable width, and of a width greater than the width of the box links, we obtain several advantages, one of which is a considerable tread surface centrally of the tire upon the road, another a considerable protection to the tire itself, since, as the cross chains are located relatively close together it follows that by making the block-formed link of greater width than the box-formed links a greater surface of the tire is protected lengthwise of the tire as well as a greater tread surface on the road obtained, so that the box links may be made comparatively small, as the larger proportion of the wear comes upon the block links. But in addition to these advantages, we obtain a very important advantage, in that, by making the block links of considerable width, and of greater width than the box links, it prevents the turning over of the chain on the tire in use. In other words, the rolling of the chain and the turning over thereof upon the tire is prevented, since, as the block links are of considerable width they project beyond the plane of the sides of the box links and act to prevent the turning over of the chain upon the tire. This thus enables us to form the box links of the cross member relatively small and with rounded edges where they engage the tire, since, as stated, the formation of the block link is such that it will prevent the rolling of the box links or the turning of the cross member upon the tire. Thus there are important advantages in making the block link of cruciform construction.

It will also be observed that by forming the block link in the manner shown the apertured extensions thereof receiving the loops of the box links will also receive the wear where the box link loops are offset, so that such wear comes upon the block link and cannot come upon the loops of the box links.

We claim as our invention:

1. A box link for a cross member of an anti-skid tire chain, comprising a pair of spaced and maintained apart flat parallel members having parallel side edges and connected by a bent portion forming a loop projecting from such flat members and also having at its opposite end a loop projecting from such flat members and having at the juncture points thereof with the body portion the same width as such body portion, whereby the outer side edges of the body portion and the juncture points of the loop at the outer sides thereof are flush.

2. A box link for a cross member of an anti-skid tire chain, comprising a pair of spaced and maintained apart flat parallel body portions connected by a bent portion and having a loop projecting from such flat body portions the outer sides of which are flush with the outer sides of the body portions and also having a longitudinal slot opening into such loop.

3. A cross member for an anti-skid tire chain, comprising a centrally located block-link having at each side thereof a plurality of box links, each of said box links having integral loops disposed transversely to each other and each terminal box link being similarly formed to its companion box links, but having a longitudinal slot opening into one of its loops whereby the box links may be articulated without cutting the loops of such box links, said block link being articulated by integral loops with the box links at each side thereof.

ROBERT N. EVANS.
PHILLIP T. HAMM.

Witnesses:
F. E. BOYCE,
C. A. WEED.